United States Patent [19]

Mesek

[11] 3,952,124

[45] Apr. 20, 1976

[54] BACK-TO-BACK TRANSITION WEB AND METHOD OF MAKING SAID

[75] Inventor: Frederick K. Mesek, Downers Grove, Ill.

[73] Assignee: Johnson & Johnson, New Brunswick, N.J.

[22] Filed: July 9, 1973

[21] Appl. No.: 377,373

[52] U.S. Cl. .............................. 428/218; 156/62.2; 156/62.8; 428/284; 428/288; 428/290; 428/298; 428/299; 428/301; 428/302
[51] Int. Cl.² ...................... B32B 5/14; B32B 5/26; B32B 5/28; B32B 31/12
[58] Field of Search .................... 19/145.5, 156.3; 156/62.2, 62.8; 161/155, 166, 152, 156; 428/218, 284, 288, 290, 298, 299, 301, 302

[56] References Cited
UNITED STATES PATENTS

| | | | |
|---|---|---|---|
| 41,727 | 2/1864 | Stoddard | 161/152 |
| 1,500,207 | 7/1924 | Shaw | 161/155 |
| 2,765,247 | 10/1956 | Graham | 161/155 |
| 3,017,304 | 1/1962 | Burgeni | 161/152 |
| 3,483,051 | 12/1969 | Mesek et al. | 156/62.2 |
| 3,535,187 | 10/1970 | Wood | 156/62.2 |
| 3,726,750 | 4/1973 | Stillings | 161/156 |
| 3,740,797 | 6/1973 | Farrington | 19/156.3 |
| 3,768,118 | 10/1973 | Ruffo et al. | 19/156.3 |
| 3,772,739 | 11/1973 | Lovgren | 19/156.3 |
| 3,817,820 | 6/1974 | Smith | 161/155 |
| 3,895,089 | 7/1975 | Gogal | 19/156.3 |

*Primary Examiner*—J. C. Cannon

[57] ABSTRACT

A method for producing a multi-layer web, and the web produced thereby, are disclosed. The nonwoven web consists of two half-thickness portions laminated to each other. A first half-thickness portion is characterized by a given overall concentration of long and short fibers and has one face enriched in long fibers above the overall concentration and the other face enriched in short fibers above the overall concentration. The concentrations of long and short fibers decrease substantially uniformly from the enriched faces to form a transition region within the half-thickness portion. The second half-thickness portion is bonded to the short fiber-enriched face of the first half-thickness portion and has an outer face (opposite the bonded face) of substantial structural integrity as compared to the short length fiber-enriched face of the first half-thickness portion. In the preferred embodiment, the second half-thickness portion is similar to the first half-thickness portion and bonded in mirror image relationship thereto.

The method produces two half-thickness portions which are bonded together to form a multi-layer web. A first half-thickness portion is produced by feeding long and short fibers at given concentrations to individualizing means. The individualized fibers are deposited on a moving foraminous belt to produce a half-thickness portion enriched with long fibers at one face and short fibers at the other face and having a transition of fiber concentrations between the faces. A second half-thickness portion having at least an outer face with greater structural integrity than the short fiber-enriched face of the first half-thickness portion is produced by air-laying techniques. The second half-thickness portion is bonded with its outer face opposite the pulp-enriched face of the first half-thickness.

18 Claims, 8 Drawing Figures

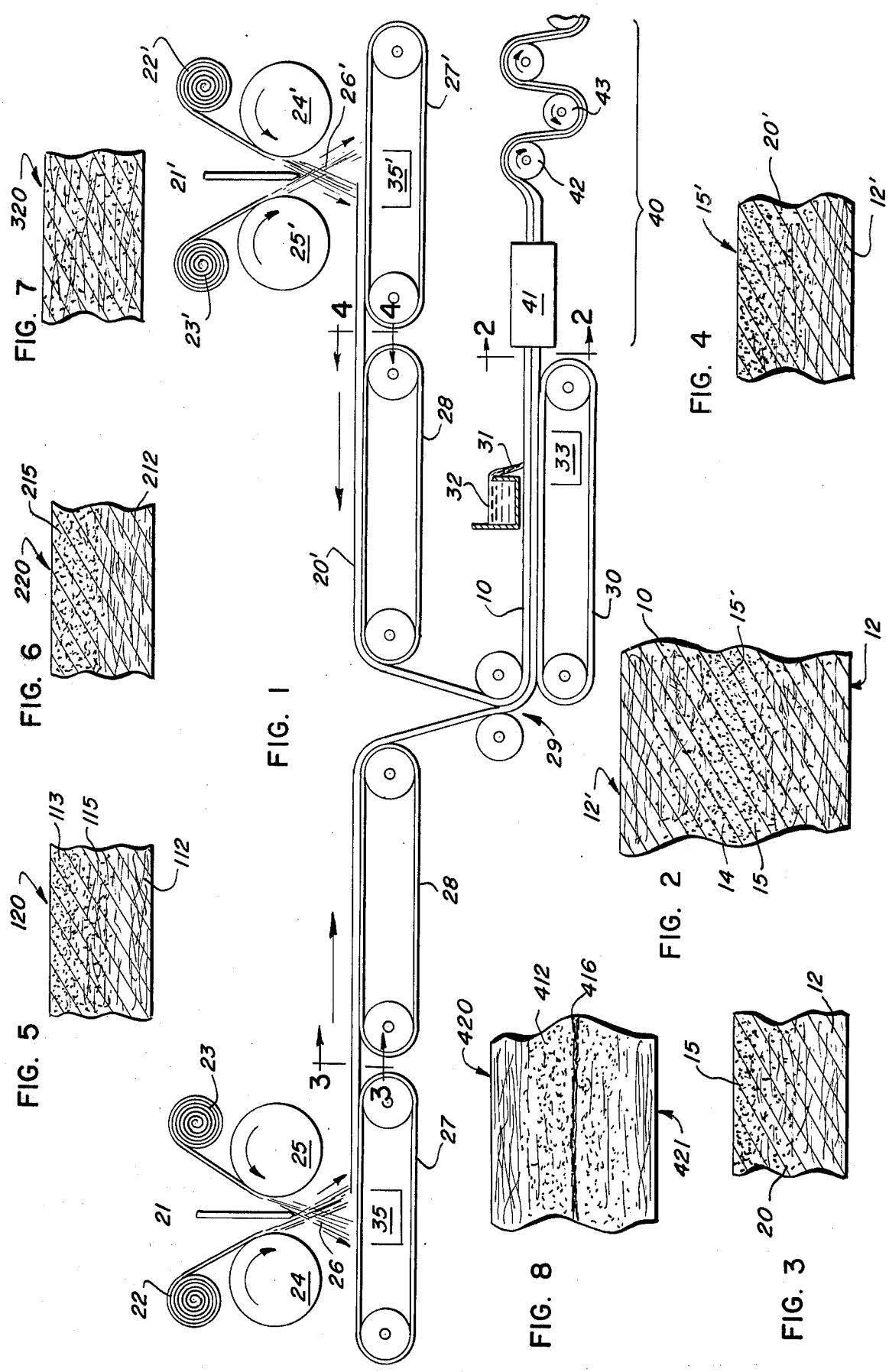

BACK-TO-BACK TRANSITION WEB AND METHOD OF MAKING SAID

BACKGROUND OF THE INVENTION

This invention relates to an improved nonwoven web and the method for producing these webs. Preferably, the webs produced by the process of this invention are made of long and short fibers, i.e., textile length and paper-making fibers, with the fibers of the web being randomly oriented, the web having different concentrations of long and short fibers in different portions of its thickness.

Fibers are usually classified according to length, with relatively long or textile length fibers being longer than about one-quarter inch and generally between one-half and two and one-half inches in length. The term "long fibers," as used herein, refers to textile length fibers having a length greater than one-quarter inch and the fibers may be of natural or synthetic origin. The term "short fibers," as used herein, refers to paper-making fibers, such as wood pulp fibers or cotton linters having a length less than about one-quarter inch. While it is recognized that short fibers are usually substantially less costly than long fibers, it is also recognized in many instances that it is desirable to strengthen a short fiber product by including a blend of long fibers therein.

Nonwoven materials are structures which in general consist of an assemblage or web of fibers, joined randomly or systematically by mechanical, chemical or other means. These materials are well known in the art, having gained considerable prominence within the last 25 years or so in the consumer market, inductrial commercial market and in the hospital field. Typical of their use in hospital caps, dental bibs, eye pads, dress shields, shoe liners, shoulder pads, skirts, hand towels, handkerchiefs, tapes, bags, table napkins, curtains, draperies, etc.

Significant cost savings can be realized in a nonwoven web by using short length fibers. However, due to the low tensile strength of short length fiber webs, exclusive use of such fibers is impractical. As a result, prior art webs made from short length fibers have been commercially undesirable, not only due to their low tensile strength, but also due to the increased dusting effect caused by separation of individual fibers from the web.

SUMMARY OF THE INVENTION

In accordance with the present invention, a combination web is provided which retains the advantageous functional characteristics of improved feel and comfort with high tensile strength for dimensional stability, and web integrity at low cost.

The web of the present invention is formed by two half-thickness portions which are bonded together in laminar fashion to form a composite web. One half-thickness portion web is formed of long fibers and short fibers at a given overall concentration. In order to give the proper feel and comfort characteristics as well as draping, one face of this one half-thickness portion comprises a mixture of long and short fibers which is enriched with respect to long fibers in excess of the overall concentration. And, to minimize the cost, the other face of this half-thickness portion comprises a mixture of long and short fibers enriched with respect to short fibers in excess of the overall concentration. Within this half-thickness portion, the concentrations of long and short fibers decrease at increasing distances from their enriched faces to provide a transitional region within the first half-thickness portion web. The decrease in fiber concentrations from one face to another face takes place throughout the web, which is to say that there is no sharp interface between one concentration and another, and that the concentration of a particular fiber at any depth is less than its concentration at a depth closer to one face and more than its concentration at a depth closer to the opposite face, although not necessarily by the same amount. A second half-thickness portion is bonded to the short fiber-enriched face of the first half-thickness portion web and is characterized by an outer face, opposite the bonded face, having greater structural stability than the short fiber-enriched face of the first half-thickness portion. In this manner, the composite web of the present invention is provided with outer faces having substantial structural integrity, but with an interior portion of low cost short fibers. In the preferred embodiment, the second half-thickness portion is similar to the first half-thickness portion and bonded thereto in mirror-like relationship.

The half-thickness portions of the present invention may be most conveniently formed by an air laying technique and then subsequently bonded together to form the composite web. Recent improvements have been made in such techniques, such as, for example, the improvements disclosed and claimed and commonly assigned, copending Ruffo, et al. application, Ser. No. 108,546, filed Jan. 21, 1971, now U.S. Pat. No. 3,768,118, issued Oct. 30, 1973 the disclosure of which is hereby incorporated herein by reference.

Briefly, one of the air laying techniques disclosed in Ruffo et al and utilized as a preferred technique in the method of this invention for forming either or both of the half-thickness portions includes the steps of feeding fibers of two different types to separate fiber opening means at given rates to provide in each half-thickness portion a given overall concentration of long and short fibers, individualizing the fibers from the separate fiber sources, suspending the fibers from each source in separate gaseous streams, and impelling the gaseous streams at least initially towards one another and combining the gaseous streams to form a combined gaseous carrier stream. At gas to fiber volume rations above 12,000:1, the fibers in the individual gaseous streams are spaced sufficiently from one another so that if the gaseous streams are brought together at an angle without substantial diminution in their velocity, fibers in each gaseous stream will cross over the oncoming fibers of the other gaseous stream to form, upon deposit of the fibers, a nonwoven half-thickness which is characterized by a concentration of long fibers on one face in excess of the overall concentration and a concentration of short fibers on the other face in excess of the overall concentration, with a transitional zone between the faces so that the concentration of long and short fibers gradually diminishes away from the face having the maximum concentration to the opposite face. This process of forming the individual half-thickness portions uses a combination of techniques including the shingling of fibers during the air-laying process and controlled binder application, which cooperates with the short and long fiber distribution in the half-thickness portion, to maintain structural integrity therein.

The preferred half-thickness portions referred to as "transition" webs, are then combined in laminar fashion with their pulp-enriched faces in juxtaposition to produce the final web of one species of this invention.

Several alternate embodiments of the present invention are disclosed which utilize a single transition web which is joined at its pulp-enriched face to a second half-thickness portion, having greater structural stability than the pulp-enriched face of the transition web.

Among the embodiments of particular interest are those utilizing as a second half-thickness portion, other webs obtainable in accordance with the disclosure of said Ruffo et al. patent application. As disclosed in said application, several different types of webs may be produced on apparatus in which fibers from two separate individualizing means are suspended in separate gaseous streams leading to common duct, depending on the degree of intermixing of the fibers permitted by a baffle within the duct. Adjustment of the vertical position of the baffle can provide any one of (1) a web of uniform blended composition throughout its thickness or either of two different forms of webs of non-uniform composition throughout their thickness, namely (2) a web having outer layers comprised of fibers from two different fiber sources and an intermediate layer that is a blend of the fibers from each source, or (3) a web of two layers of fibers from each fiber source, with the layers being interlaced only at their interface.

All of these variations are useful as the second half-thickness portion to be joined to the pulp-enriched face of a transition web in accordance with this invention. In the case of the non-uniform products (2) and (3), it is the short fiber face of the second half-thickness portion that is laminated to the transition web so that the face with the longer fibers remains an outer face after lamination.

In addition to the above products which can be used as the second half-thickness portion, the invention also contemplates (4) a layer made entirely of long fibers and (5) a layer made entirely of pulp fibers. The former of the last-named embodiments is not preferred because of its expense and the latter is not preferred because it requires an additional external layer (such as a woven layer or a plastic film layer) for reinforcement and for the prevention of dusting.

As will be discussed in greater detail below, the present invention in its preferred embodiments is directed to a transition web which is improved by the addition of a second web having a greater structural stability than the short fiber-enriched face of the transition web so that the resulting composite web has improved feel and strength characteristics and the tendency of the short fibers at the interior of the composite web to dust, is thereby minimized.

Although the composite web of the present invention is formed from two half-thickness portions, it should be understood that the term "half-thickness" does not necessarily mean that each portion is exactly the same thickness as the other or exactly 50% of the thickness of the composite web. The half-thickness portions can differ in their separate thicknesses, but when they do, the thinner portion should comprise at least 20% of the total thickness of the composite web.

BRIEF DESCRIPTION OF THE DRAWINGS

FIG. 1 is a simplified schematic view of a preferred embodiment of the production line on which a web of the present invention is made;

FIG. 2 is an enlarged cross section view of the web, taken along line 2—2 of FIG. 1;

FIGS. 3 and 4 are enlarged cross section views of the half-thickness portions taken generally along lines 3—3 and 4—4 of FIG. 1;

FIGS. 5–7 are enlarged cross section views illustrating alternate embodiments for one half-thickness portion which may be substituted for the half-thickness portion of FIG. 4; and FIG. 8 is an enlarged cross section view illustrating another embodiment of the total composite web suitable for a particular end use.

DETAILED DESCRIPTION OF THE PREFERRED EMBODIMENT

While this invention is susceptible of embodiment in many different forms, there is shown in the drawings and will herein be described in detail, a preferred embodiment of the invention and modifications thereof, with the understanding that the present disclosure is to be considered as an exemplification of the principle of the invention, and is not intended to limit the invention to the embodiment illustrated. The scope of the invention will be pointed out in the appended claims.

Web 10 (FIG. 2) is a final web produced in accordance with the present invention and is formed by joining two transition webs 20 (FIG. 3) and 20' (FIG. 4). Since structural integrity is a prime consideration in the formation of the webs of this invention, in any embodiment of the present invention, a transition web is joined to the second web so that the transition web face enriched in long or staple fibers is an outer face of the final web. The opposite outer face of the final web has greater structural stability than the enriched short fiber face of the transition web.

Web 10 (FIG. 2) is preferably formed by utilizing an air-laying process, such as, for example, the process disclosed in the above mentioned Ruffo et al. application, to produce two separate transition webs which are joined to form a final multilayer web, having opposed outer major faces 12 and 12', and central portion 14. The transition zones between the faces 12 and 12' and central portion 14 are characterized by decreasing concentrations of textile length fibers from the faces to the central portion of the product. Faces 12 and 12' preferably are comprised of a greater amount by weight of textile length fibers and a lesser amount by weight of short cellulosic fibers (as compared with the overall concentrations of these fibers in each transition web) interspersed and blended therewith; with central portion 14 preferably being comprised of a greater amount by weight of short cellulosic fibers and a lesser amount by weight of textile length fibers (as compared to the overall concentrations of these fibers in each transition web) interspersed and blended therewith. It should be noted that while the central portion has been designated as element 14 for identification purposes, there is no sharp interface between it and faces 12 and 12' since the composition changes are gradual.

As illustrated in FIG. 1, the web of this invention is formed from two separately air-laid transition webs 20 and 20' which are then placed in juxtaposition by a combining means 29. After juxtapositioning, the webs are treated with a bonding agent, such as a self-cross-linking acrylic emulsion to provide structural integrity to the combined webs. One bonding agent which has been employed with considerable success is a latex of polyethyl-acrylate copolymer containing small amounts of acrylonitrile and a cross-linking monomer sold under the trademark HYCAR 2600 × 120. The bonding agent should preferably be of the low viscosity type with a viscosity less than 5 centipoises.

Half-thickness portions 20 and 20' of the web 10, as described above, are preferably formed in accordance with the process disclosed in the above-mentioned Ruffo et al application. Each half-thickness portion has an overall concentration of short fibers, not exceeding about ¼ inch in length. The average short fibers are from about 1/16 to about 3/16 inch in length. The half-thickness portions are prepared initially at positions 21 and 21', which are similar in operation and correspondingly numbered. During the description of operation, only one station will be described, but it will be understood that the descritpion is equally applicable to the other or prime numbered station.

The half-thickness portion 20 is prepared by first feeding a supply of short cellulosic fibers 22 and a supply of textile length fibers 23 to a fiber opening and mixing apparatus 26, which take the form of two individual rotating lickerins 24 and 25, as described in the above-mentioned Ruffo et al. application. The fibers 22 and 23 are fed to the opening means 24 and 25, respectively, at a desired rate to provide a web 20 with a desired overall fiber concentration. Apparatus 26, in addition to opening the fiber sources 22 and 23 and individualizing the fibers, also suspends the fibers from each source in separate gaseous streams which are impelled toward one another and combined to form a carrier gaseous stream wherein the fibers from each separate stream cross over one another. In this arrangement, the fibers from lickerin 25 tend to be deposited onto an upstream portion of the foraminous belt 27 and the fibers from lickerin 24 tend to be deposited further downstream on the previously deposited fibers from lickerin 25. The deposited fibers are condensed on the belt 27 by suction box 35 which pulls air, as by suction fans, at a high velocity, through the belt 27 and deposited fibers. Each half-thickness portion 20 is characterized by a major face 12 adjacent to belt 27 enriched in long fibers and a second major face 15 enriched in short fibers. And, the concentrations of long and short length fibers decrease at increasing distances from their enriched faces.

The webs 20 and 20' emerging from apparatus 26 and 26' are carried by conveyors 28 and 28' to a combining apparatus 29 wherein the webs are placed in juxtaposition so that the combined web 10 is characterized by outer surfaces 12 and 12' enriched in long length fibers.

The combined web 10 is then carried by a conveyor 30 to a binding station 31 where they may be through-bonded by a binding agent of the type described above from source 32. The binder is deposited on one face of web 10 from source 32 and the combined web then passes over a suction source 33 which draws the binder through the web and removes any excess binder solution.

The combined web 10 is then dried by passing through drying station 40. Preferably, the drying station is in two stages: (a) a first stage which is designed to promote a drying action throughout the depth of the combined web and is illustrated schematically by a box designated as 41; and (b) a second stage which is designed to apply heat to the exterior surfaces of the web and is illustrated by a series of alternatingly rotating steam cans 42 and 43.

In the drying of a web by the application of heat to the web surfaces, there is a tendency for the binder solution to migrate towards the heat source as the water carrier is evaporated. Reliance on surface heating as the sole means of drying may cause sufficient binder migration to adversely affect the strength of the interior of the composite web. It is therefore preferred that a portion of the heating action be carried out in a manner which makes heat available at the interior of the web, such as dielectric heating, infrared heating or heating by a strong current of hot air which brings heat to the interior of the web by convection.

The relative proportions of evaporation achieved in the first and second stages will depend upon the balance of properties desired in the final fabric. It is desired to have sufficient migration to the major surfaces to provide the desired strength and abrasion resistance at the surfaces, but not so much migration that the surfaces become harsh or that the center of the fabric is so weakened that delamination can occur during normal use.

After the drying process is completed, the final web 10 proceeds to further processing such as printing, cutting and packaging for ultimate consumer uses.

For some end uses of the web, it may be desirable that it be more easily delaminatable. For webs intended for such uses, the first stage drying may be reduced to a minimum or completely eliminated to permit greater migration of binder to the opposite faces and leave less binder in the mid-portion of the web. Conversely, for other end uses it may be desirable to provide maximum assurance against delamination and for webs intended for such uses, the first steam can drying may be reduced to a minimum.

For some applications it may be desirable to through-bond each half-thickness portion web separately and then bond them together. To this end, binder stations, similar to station 31, would be positioned relative to conveyors 28 and 28' which would, of course, be foraminous belts. With this type of apparatus, binder station 31 would be removed and a bonding applicator could be positioned between web 20 and 20' above the combining apparatus 29 to deposit bonding at their interface.

As discussed above, the second half-thickness portion web may be a variety of types so long as the outer face (opposite the face which is bonded to the pulp enriched face of the first half-thickness portion web) is of greater structural integrity than the pulp-enriched face of the transition web. FIGS. 5–7 illustrate some of the alternative embodiment for the second half-thickness portion web.

FIG. 5 illustrates a half-thickness portion 120 which is characterized by a homogeneous thickness portion 115 of uniformly blended long and short fibers sandwiched between thickness portion 113 of short fibers at one surface and thickness portion 112 of long fibers at the other surface. The embodiment of FIG. 5 is related to the embodiment of FIG. 9 of the Ruffo et al application and is made when the baffle between the lickerins is maintained at an intermediate level, as shown in FIG. 6 of Ruffo et al. In this embodiment, the short fiber portion is bonded to the short fiber-enriched face of the transition web 20.

FIG. 6 illustrates a second alternative web embodiment 220 for the second half-thickness portion which is characterized by a thickness portion 215 of short length fibers adjacent one surface and a thickness portion 212 of long length fibers adjacent the other surface. The embodiment of FIG. 6 is related to the embodiment of FIG. 10 of the Ruffo et al. application and is made when the baffle between the lickerins is maintained at a low level, as shown in FIG. 7 of Ruffo et al. In essence, this embodiment is the limiting case of the embodiment of FIG. 5 where the uniform mixture layer has been reduced to zero thickness.

A third alternate embodiment 320 for the second half-thickness portion is illustrated in FIG. 7. Web 320 is formed entirely of a single layer of a uniform mixture of long and short fibers. The embodiment of FIG. 7 is related to the embodiment of FIG. 8 of the Ruffo et al. application and is made when the baffle between the lickerins is maintained at a high level, as shown in FIG. 5 of Ruffo et al. In essence, this embodiment is the opposite limiting case of the embodiment of FIG. 5 where the uniform mixture layer has been expanded to the entire thickness of the half-thickness portion.

Each transition web, on an overall basis, is made from a given overall concentration of short fibers, such as wood pulp fibers or cotton linters and a given overall concentration of long fibers, such as rayon, polyester, cellulose acetate, nylon, etc. The overall concentration of long fibers may be in varying percentages — in a range from 2 to 50% and preferably from 10 to 25%, with the remainder being made up by short fibers — for example, blends of 25 percent rayon fibers and 75 percent wood pulp fibers.

The amount of long fibers within the enriched face of the transition web is increased by at least 30 percent of its overall concentration while the long fibers are decreased by the same amount in the pulp enriched face. In the above mentioned example, having an overall concentration of 25 percent rayon fibers and 75 percent pulp fibers, an enrichment of at least 30 percent of long fibers means a concentration of at least 32.5 percent of rayon on one face and a concentration of at least 82.5 percent of pulp on the other.

While the preferred embodiment utilizes two juxtaposed transition webs 20 and 21, it should be noted that the transition webs may be different as to the nature of the long or short fibers used, the overall concentrations, the thicknesses, or the amount of enrichment at each base.

For some uses it may be advantageous to use different long fibers in the half-thickness portions of FIGS. 3 and 4 because of the different exposure of the opposite sides of the composite web and the different requirements at each side. When the composite web is to be used as a diaper facing fabric, for example, one face (intended to come into contact with the baby's skin) can be rich in long fibers of rayon which provides the desired strength in combination with a smooth feel. The opposite face (intended to be on the interior of the diaper) can be rich in long fibers of water-insoluble polyvinyl alcohol which, despite its harsher feel, can be used to provide the desired strength more effectively because of its excellent bonding properties. Alternatively, the fabric can be rich in long polyester fibers on its outer face to provide superior smoothness and rich in a less expensive long fiber on its opposite face.

For some applications, as when the final web is used in diapers or sanitary napkins, it is desirable to counteract the water repellency of the binder. To this end, a surfactant, preferably a non-ionic surfactant, may be included in a binder suspension. A non-ionic surfactant which has been found to be suitable is polyoxyethylene sorbitan monolaurate sold under the trademark TWEEN 20.

In a typical application, the binder suspension is controlled to give the fabric a dry solids add on the range of from about 4½ to 9% based on the fabric weight, of which from about 0.15 to about 0.30% is the amount of surfactant. In webs having an extremely low percentage of textile length fibers, the binder amount would be toward the high side of the above-mentioned range. It will be understood that the above-mentioned surfactants moderate and reduce the water repellency which may be imparted to the short and long fibers of the web by the bonding agent which bonds them into an integral layer.

This invention, in its most advantageous form, utilizes a second half-thickness portion which at its outer surface has greater structural stability than the pulp-enriched face of the transitional web. In some cases, however, the outer layer of the second half-thickness portion may be strengthened by adhering thereto a fabric or a plastic sheet. Or, when the outer surface of the second half-thickness portion is high in pulp fiber content, a paper-like, densified, compacted, cellulosic layer may be integrally formed therewith for structural reinforcement. The method of forming the densified paper-like layer is known in the art, e.g., Burgeni, U.S. Pat. No. 3,017,304.

In one useful embodiment employing a densified paperlike layer, two half-thickness portions are prepared as transitional webs, and the pulp-enriched faces are slightly moistened before bringing them together to form a composite web which is then subjected to compression. This produces a fabric (shown in FIG. 8), having a concentration of long fibers at each major face 420 and 421, a concentration of short fibers in the interior 412 and a densified, compacted, paper-like, cellulosic layer 416 at a mid-phase therein. Such a fabric with or without subsequent binder application can be used as a wiping towel.

The non-woven web of the invention, as described above, has advantageous properties when used as fabricated. For some purposes, however, the composite non-woven web may comprise an intermediate manufacturing stage and may be split, or delaminated into two half-thickness webs before use in the final environment. In an assembly line in which the limit of line speed is determined by the limit of linear through-bonding capacity or the limit of linear drying capacity, the productivity of the line may be increased by providing a composite web for through-bonding, or for drying, and thereafter splitting the composite web along its central phase to produce two half-thickness webs. The web produced by the apparatus of FIG. 1 is particularly useful for this type of production since the individualized fibers are deposited on the foraminous belt in a shingle-like manner in the longitudinal direction of the web. This shingling effect produces a web which resists splitting in one direction (opposite the shingling) but may be uniformly split in the shingling direction. Mesek, U.S. Pat. No. 3,483,051, discloses a method which may be utilized with the present invention to split the final web into two transitional webs.

The splitting of a composite web into two separate half-thickness webs may also be advantageous when it is desired to have a low binder content at the face of the web having an enriched short fiber content. As stated above, the drying process tends to concentrate binder at the outer faces and any half-thickness web made directly (without being laminated to another web during fabrication) would have approximately equivalent concentrations of binder at batt major faces. In contrast, a composite web tends to have a low concentration of binder at its central plane, and when split, provides a low concentration of binder at the short fiber-rich face.

In the manufacture of the web of this invention by the method of FIG. 1, belts 20 and 20' move toward each other and the half-thickness portions formed thereon are joined together at their exposed surfaces, rich in short fibers. If desired, however, belt 20' can be arranged to move in the same direction as belt 20 and to have fiber source 22' and 23' reversed in position with respect to the belt movement so that the short fibers are primarily deposited upstream and are enriched in the face in contact with the belt. In this case, the web formed in belt 20' would be taken off the belt and transposed onto the top of the web produced on belt 20 so that the short fiber-rich surface originally in contact with belt 20' comes into contact with the short fiber-rich exposed surface of the web on belt 20. In this case, the shingling of fibers on both half-portions would be in the same direction, which may be advantageous for certain end uses.

The web of this invention can also be manufactured on a single belt, rather than on a pair of belts such as belts 20 and 20'. Fiber sources 22' and 23', together with lickerins 24' and 25' and baffle 21' may be transposed to overlie belt 20 at a location downstream of the comparable elements 22, 23, 24, 25 and 21. In this case, a stream rich in long fibers crossed over from lickerins 25 would be deposited first, a stream rich in short fibers crossed over from lickerin 24 would be deposited second, a stream rich in short fibers crossed over from lickerin 24' would be deposited third, and a stream rich in long fibers crossed over from lickerins 25' would be deposited fourth.

It will be understood by those skilled in the art that variations and modifications of the specific embodiments described above may be employed without departing from the scope of the invention as defined in the appended claims.

I claim:

1. A nonwoven web comprising: two juxtaposed through-bonded half-thickness portions, each half-thickness portion having a major face facing outwardly in said web, including a first nonwoven half-thickness portion being characterized by a given overall concentration of long fibers and short fibers, said first half-thickness portion having long fibers in excess of said given overall concentration at one major face and having short fibers in excess of said given overall concentration at the other major face, and having a transition of fiber concentrations between said major faces, and a second nonwoven half-thickness portion bonded to said first half-thickness portion at said face wherein the concentration of short fibers is in excess of said given overall concentration, said second half-thickness portion having at its outer face a concentration of long fibers in excess of the concentration of long fibers at said bonded face of said first half-thickness portion.

2. A nonwoven web as set forth in claim 1 wherein said second half-thickness portions comprise a thickness layer characterized by a uniform mixture of long and short fibers, sandwiched between a layer of short fibers and a layer of long fibers, said second half-thickness portion being bonded at its short fiber layer to said first half-thickness portion.

3. A nonwoven web as set forth in claim 1 wherein said second half-thickness portion web comprises two thickness layers, including a first thickness layer of short fibers, and a second thickness layer of long fibers, said second half-thickness portion being bonded at its short fiber layer to said first half-thickness portion.

4. A nonwoven web as set forth in claim 1 wherein a compacted, densified skin comprising short cellulosic fibers as the predominant constituent is located at the interface of the two juxtaposed half-thickness portions.

5. A nonwoven web as set forth in claim 1 wherein said second half-thickness portion is characterized by a given overall concentration of long and short fibers, said second half-thickness portion having long fibers in excess of said given overall concentration at one major face and having short fibers in excess of said given overall concentration at the other major face and having a transition of fiber concentrations between said major faces.

6. A nonwoven web as set forth in claim 5 wherein the long fibers of said first and second half-thickness portions are different from each other.

7. A nonwoven web as set forth in claim 5 wherein the long fibers of said first and second half-thickness portions are of the same fiber material.

8. A nonwoven web as set forth in claim 5 wherein the short fibers of said first and second half-thickness portions are of the same fiber material.

9. A nonwoven web as set forth in claim 5 wherein the short fibers of said first and second half-thickness portions are different from each other.

10. A nonwoven web as set forth in claim 5 wherein the given overall concentrations of long and short fibers in said first and second half-thickness portions are the same.

11. A nonwoven web as set forth in claim 5 wherein the given overall concentrations of long and short fibers in said first and second half-thickness portions are different.

12. A nonwoven web as set forth in claim 5 wherein the concentrations of long and short fibers at the faces of said first and second half-thickness portions wherein said concentrations are in excess of the given overall concentration for each half-thickness portion web are the same.

13. A nonwoven web as set forth in claim 5 wherein the concentrations of long a short fibers at the faces of said first and second half-thickness portions wherein said concentrations are in excess of the given overall concentration for each half-thickness portion webs are different.

14. A nonwoven web as set forth in claim 5 wherein said first and second half-thickness portions are of equal thickness.

15. A nonwoven web as set forth in claim 5 wherein said first and second half-thickness portions are of different thicknesses.

16. A through-bonded nonwoven web comprising two half-thickness portions laminated to each other, at least one half-thickness portion being characterized by a given overall concentration of long fibers and short fibers, said half-thickness portion having long fibers in excess of said given overall concentration at one major face and having short fibers in excess of said given overall concentration at the other major face, and having a transition of fiber concentrations between said major faces, and a second half-thickness portion through-bonded to the face of said first half-thickness portion wherein the concentration of short length fibers is in excess of said given overall concentrations, said second half-thickness portion being selected from the group consisting of (a) portions characterized by a uniform blend of long and short fibers throughout their thickness, (b) portions comprised entirely of long fibers, (c) portions comprised entirely of short fibers, (d) portions characterized by a predominance of short fibers at their inner major faces, a predominance of long fibers at their outer major faces and a transition of fiber concentrations between the faces, and (e) portions characterized by a layer of short fibers defining their inner major faces and a layer of long fibers defining their outer major faces and having sharp interfaces between adjacent layers.

17. A method of forming a multi-layer nonwoven web containing long and short length fibers from two half-thickness portions comprising the steps of: (1) forming a first half-thickness portion by, (a) providing a separate mass of each of said fibers; (b) individualizing the fibers from each mass at a given overall concentration at closely spaced locations; (c) entraining the individualized fibers from each mass in a separate gaseous stream; (d) impelling each of the gaseous streams carrying the entrained fibers toward one another; (e) combining said gaseous streams by bringing the streams together at an angle at a common point to form a single combined gaseous stream, the space between fibers in each said first and second streams being sufficient to permit the majority of the fibers in each of said streams to intersect and transverse the fibers of the other stream; and (f) directing said combined gaseous stream to a moving foraminous surface which permits the passage of gas therethrough, but filters out said fibers and supports them as a web, thereby forming said first half-thickness portion characterized by short fibers in excess of said given overall concentration at one face, and long fibers in excess of said given overall concentration at the other face, and a transition of fiber concentrations between said faces; (2) providing a second half-thickness portion having on at least one major face thereof a higher concentration of long fibers than is present at said short length fiber-enriched face of said first half-thickness portion; and (3) joining said major face of said second half-thickness portion to the short fiber-enriched face of said first half-thickness portion to form said multi-layer web.

18. A process as set forth in claim 17 wherein said second half-thickness portion is similar to and positioned in mirror image relationship with said first half-thickness portion.

* * * * *